(12) United States Patent
Watson et al.

(10) Patent No.: US 6,631,409 B1
(45) Date of Patent: Oct. 7, 2003

(54) METHOD AND APPARATUS FOR MONITORING A COMMUNICATIONS SYSTEM

(75) Inventors: Kevin Watson, Flower Mound, TX (US); David Florcik, Allen, TX (US); William Liese, Allen, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/219,415

(22) Filed: Dec. 23, 1998

(51) Int. Cl.[7] .............................................. G06F 15/173
(52) U.S. Cl. ........................ 709/224; 709/223; 709/225; 709/100; 714/43; 714/46; 714/47
(58) Field of Search .................................. 709/222, 223, 709/224, 100, 102, 103, 104, 225, 226, 202; 714/46, 43, 47

(56) References Cited

U.S. PATENT DOCUMENTS

| | | | | |
|---|---|---|---|---|
| 5,307,490 A | * | 4/1994 | Davidson et al. ............ | 709/650 |
| 5,437,009 A | * | 7/1995 | Lane ........................... | 709/161 |
| 5,758,084 A | * | 5/1998 | Silverstein et al. .......... | 709/228 |
| 5,841,972 A | * | 11/1998 | Fanshier ...................... | 709/220 |
| 6,085,244 A | * | 7/2000 | Wookey ....................... | 709/224 |
| 6,088,707 A | * | 7/2000 | Bates et al. .................. | 707/501 |
| 6,145,098 A | * | 11/2000 | Nouri et al. ................... | 714/31 |
| 6,167,537 A | * | 12/2000 | Silva et al. ................... | 714/46 |
| 6,170,009 B1 | * | 1/2001 | Mandal et al. ............... | 709/223 |
| 6,295,558 B1 | * | 9/2001 | Davis et al. ................. | 709/224 |
| 6,321,249 B1 | * | 11/2001 | Nesbitt ........................ | 709/202 |

* cited by examiner

*Primary Examiner*—Ayaz Sheikh
*Assistant Examiner*—Oanh Duong

(57) ABSTRACT

A method and apparatus provides a communications system in which a network is present that provides a plurality of communications paths. A plurality of elements is connected to the network including a monitor server, wherein the monitor server includes monitoring means for obtaining status information from the plurality of elements. Also connected to the network is a client server, wherein the client server includes communications means for retrieving status information from the monitor server. Display means is present on the client server for displaying status information on a graphical user interface.

28 Claims, 20 Drawing Sheets

FIG. 5G

| Switch | Span | Act | Channels |
|---|---|---|---|
| RES1 | SPAN2 | 0 | |
| RES1 | SPAN2 | 0 | |
| RES2 | SPAN6 | 3 | |
| RES2 | SPAN7 | 2 | |
| RES6 | SPAN1 | 1 | |
| RES6 | SPAN3 | 1 | |
| RES9 | SPAN17 | 5 | |

|  | InBand | OutBand | SS7 Only | ISDN |
|---|---|---|---|---|
| Complete | 8196 | 11393 | 227 | 2504 |
| Running | 0 | 0 | 0 | 0 |
| Executing | 2 | 5 | 0 | 5 |
| Serving | 0 | 0 | 0 | 0 |
| Waiting | 2 | 3 | 0 | 6 |

| GeoffHart | RES2 | 194 |
| GeoffHart | RES1 | 16 |
| GeoffHart | RES9 | 7 |
| MikeHannon | RES6 | 2 |

| Service | SYSTEM | Monitor | Status | Restored | Date |
|---|---|---|---|---|---|
| Call Generator Server | COSERVER | Yes | Running | 0 | 04/02 |
| Database Server | | Yes | Stopped | 0 | 03/25 |
| Database Server1 | DESRV1 | Yes | Running | 0 | 04/21 |
| Database Server2 | DESRV2 | Yes | Running | 1 | 05/01 |
| Dialogic Server | | Yes | Stopped | 0 | 05/01 |
| Dialogic Server1 | DIALOGIC1 | Yes | Running | 0 | 04/22 |
| Dialogic Server2 | DIALOGIC2 | Yes | Running | 0 | 04/17 |
| Dialogic Server3 | DIALOGIC3 | Yes | Running | 0 | 02/25 |
| Dialogic Server5 | DIALOGIC5 | Yes | Running | 2 | 05/01 |
| Dialogic Server6 | DIALOGIC6 | Yes | Running | 0 | 12/15 |
| DSC Dialogic | DSCDDIALOGIC | No | Unknown | 0 | 03/04 |
| Execution Server | EXECSRV | No | Running | 0 | 05/25 |
| Generis Terminator | | Yes | Running | 2 | 04/30 |
| Generic Terminator1 | GTEDSRV1 | No | Unknown | 0 | 01/02 |
| Host Name Server | | No | Unknown | 0 | 02/23 |
| Hostname Server | HSTSRVR | Yes | Stopped | 0 | 04/04 |
| IP Name Server | SS7 | Yes | Running | 0 | 03/05 |
| ISUP Opec Server | DBSRV2 | Yes | Running | 0 | 04/24 |

| User Name | Facility | LoginTime |
|---|---|---|
| BruceGardener | ITP_BAG 3662 | 04/30/1999 |
| GeoffHart | ITP_GDH 4531 | 05/04/1998 |
| GeoffHart | Mom 4545 | 05/04/1998 |
| JamesDavis | ITP_DC3 4323 | 05/01/1998 |
| JamesDavis | ITP_DC3 4322 | 05/04/1998 |
| MikeHannon | ITP_MPH 4516 | 05/04/1998 |
| ReeseCampman | ITP_RLC 4081 | 05/01/1998 |
| ToeTinlin | HOSTNAMESRV | 03/16/1998 |

METHOD AND APPARATUS FOR MONITORING A COMMUNICATIONS SYSTEM

BACKGROUND OF THE INVENTION

1. Technical Field

The present invention provides an improved communications system and in particular an improved method and apparatus for monitoring elements in a communications system. Still more particularly, the present invention provides an improved method and apparatus for monitoring testing of a communications system.

2. Description of the Related Art

Communications networks have evolved to encompass a variety of services, platforms, applications, data processing system hardware, and equipment, referred to as "network products". Testing of network products occurs prior to introducing them into commercial communications networks. It is desirable to minimize the amount of time needed to test a network product so that the network product can be introduced into a commercial environment as soon as possible.

Local area network (LAN) technology and communications architectures have been used to test network products. Graphical user interfaces (GUIs) are located locally or remotely to a data processing system, which drives the actual testing of network products. This methodology is referred to as client/server technology. The graphical user interface (GUI) is an application, referred to as a "client", which executes on a data processing system in the network. A software application that is employed to satisfy the requests of a client is referred to as a "server". The server also executes on a data processing system in the network. The client/server framework preferably allows a client to be located on any data processing system in the network, even on the same data processing system on which the server resides. These technologies are used to form a communications test network to test network products.

The server traditionally synchronizes a multiplicity of clients to server functions in a communications test environment. Resources, such as available trunks, switches, automatic response units, automatic call distributors, credit card validators, and network topology are examples of resources to which the server will send and synchronize test requests. In a communications test network, heterogeneous network testing by a number of users may include a large number of servers. Heterogeneous network testing involves testing, originating, and/or terminating equipment or switches for multiple vendors. In this case, it is difficult to track the status of various servers within the communications test network. For example, a server that is down may go undetected for long periods of time because test case execution is performed in an asynchronous manner. Many test cases will have failed or will not have been executed before the problem server is identified. In this instance, when the problem server is identified, test cases may have to be repeated to properly test network products in the communications test network. As a result, the amount of time needed to test network products may increase the amount of time needed to test the network products, thus, delaying the introduction of the network products into a commercial communications system.

Therefore, it would be advantageous to have an improved method and apparatus for monitoring servers and network products in a communications test network.

SUMMARY OF THE INVENTION

The present invention provides a communications system in which a network is present that provides a plurality of communications paths. A plurality of elements is connected to the network including a monitor server, wherein the monitor server includes monitoring means for obtaining status information from the plurality of elements. Also connected to the network is a client server, wherein the client server includes communications means for retrieving status information from the monitor server. Display means is present on the client server for displaying status information on a graphical user interface.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 5A–5G are diagrams of various information windows used in a monitor machine server client in accordance with a preferred embodiment of the present invention;

DETAILED DESCRIPTION

Figure 1:
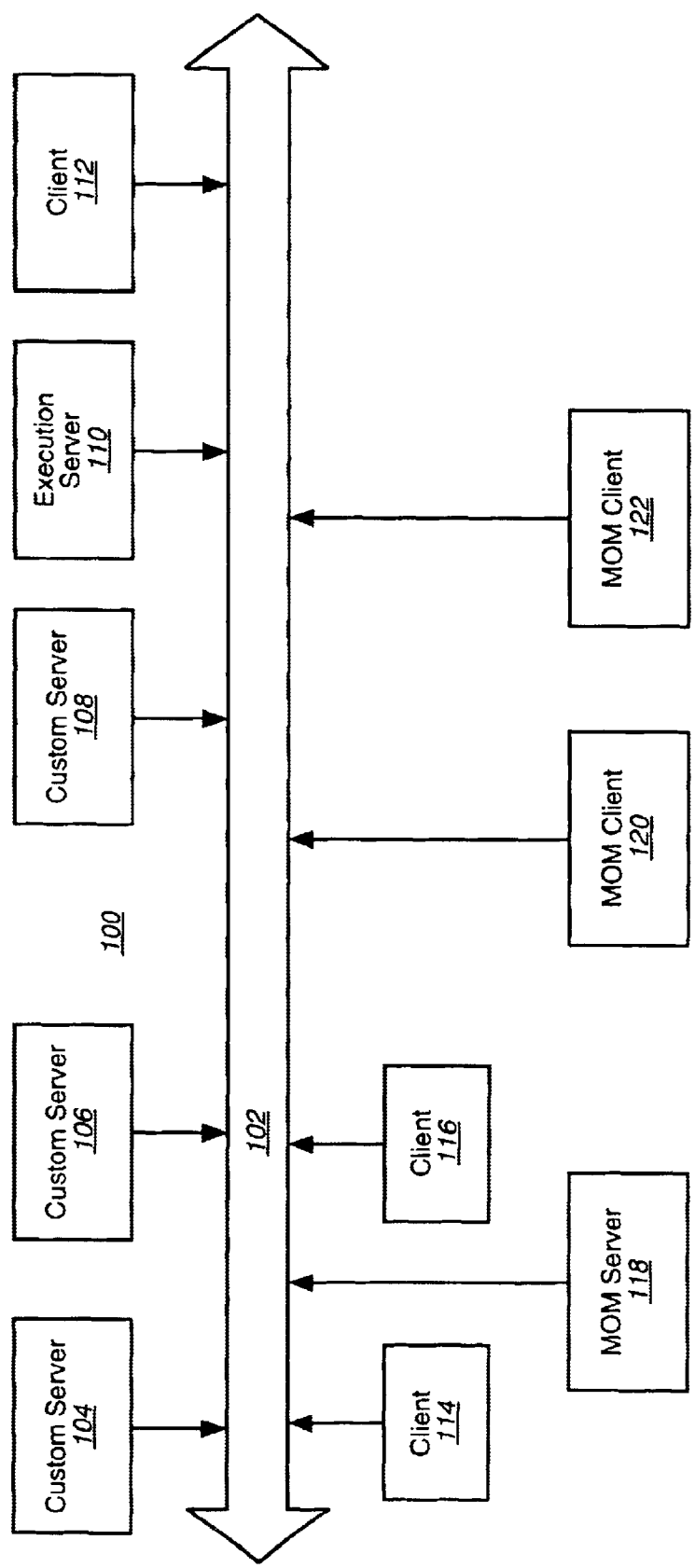
FIG. 1 illustrates a typical bus topology, which may be used in a communications network.

With reference now to the figures, and in particular with reference to FIG. 1, a simplified block diagram of a client/ server test architecture is illustrated in accordance with a preferred embodiment of the present invention. FIG. 1 illustrates a typical bus topology, which may be used in a communications network. Communications test network 100 includes a bus 102 and is employed to interconnect objects within communications test network 100, which is also referred to as a "client/server test architecture". These objects, in the depicted example, may be connected to each other using Transmission Control Protoco/Internet Protocol (TCP/IP). TCP/IP is a protocol developed by the Department of Defense for communications between computers. This protocol is built into the UNIX system and has become the de facto standard for data transmission over various networks, including the Internet. Custom servers 104, 106, and 108; execution server 110; and client machines 112, 114, and 116 are examples of objects that may be found in communications test network 100. The present invention provides a monitor machine (MOM) server 118 along with monitor machine (MOM) clients 120 and 122 in communications test network 100. Communications test network 100 may be used in either a local area network (LAN) or wide area network (WAN) environment, or in another computer environment. Bus 102 may be configured in a topology desired, such as a ring or daisy chain topology, independent of the LAN or WAN topology so long as a communications link is present between client machines 112–116 and execution server 110 and between execution server 110 and custom servers 104–108. In addition, communications test network 100 may contain different numbers of servers and client machines other than those illustrated in FIG. 1. A client machine may combine functions from both a custom server and monitor machine server. Further, communications test network 100 also may include other objects, such as, for example, a switch, a network element, or a trunk.

A "client machine" is used to perform tests on network products that may be located within a communications test network using a variety of test cases. The client machine provides an interface for managing test cases and for maintaining (e.g. create, change, delete, store, access, etc.) test cases of new or existing test platforms and applications in network products being tested. Various requests for executing test cases scheduled via the client machine. An "execution server" manages requests from client machines based on priorities assigned to the requests. The execution server supervises prioritization and scheduling of test requests from all client machines in the communications test network. The execution server also accesses information about what resources are to be used for specific types of test requests. A "custom server" is used to perform specific types of test cases. A custom server may have a number of network products or other test devices connected to it or the custom server may be directly connected to the environment that it will test. Each custom server test execution is initiated by the execution server. The custom server performs test cases and saves test results of the test case, which the custom server communicates back to the execution server. More information on client machines, execution servers, custom servers, and the testing process is found in Method And System For Heterogeneous Telecommunications Network Testing, Ser. No. 08/673,630, filed Jun. 26, 1996, and assigned to the same assignee, which is incorporated herein by reference.

The present invention provides a mechanism to monitor servers and other objects within communications test network 100 through monitor machine server 118 and one or more monitor machine clients, such as monitor machine clients 120 and 122. Monitor machine server 118 keeps track of all servers within communications test network 100 as well as other machines and network communications progress in the test environment. Status information in the depicted example is maintained within monitor machine server 118. Monitor machine clients 120 and 122 employ user friendly GUIs with graphical objects, representing objects located within communications test network 100. The objects in communications test network are placed into classes, such as, for example, client class, server class, switch class, network element class, network class, and trunk class.

Figure 2:
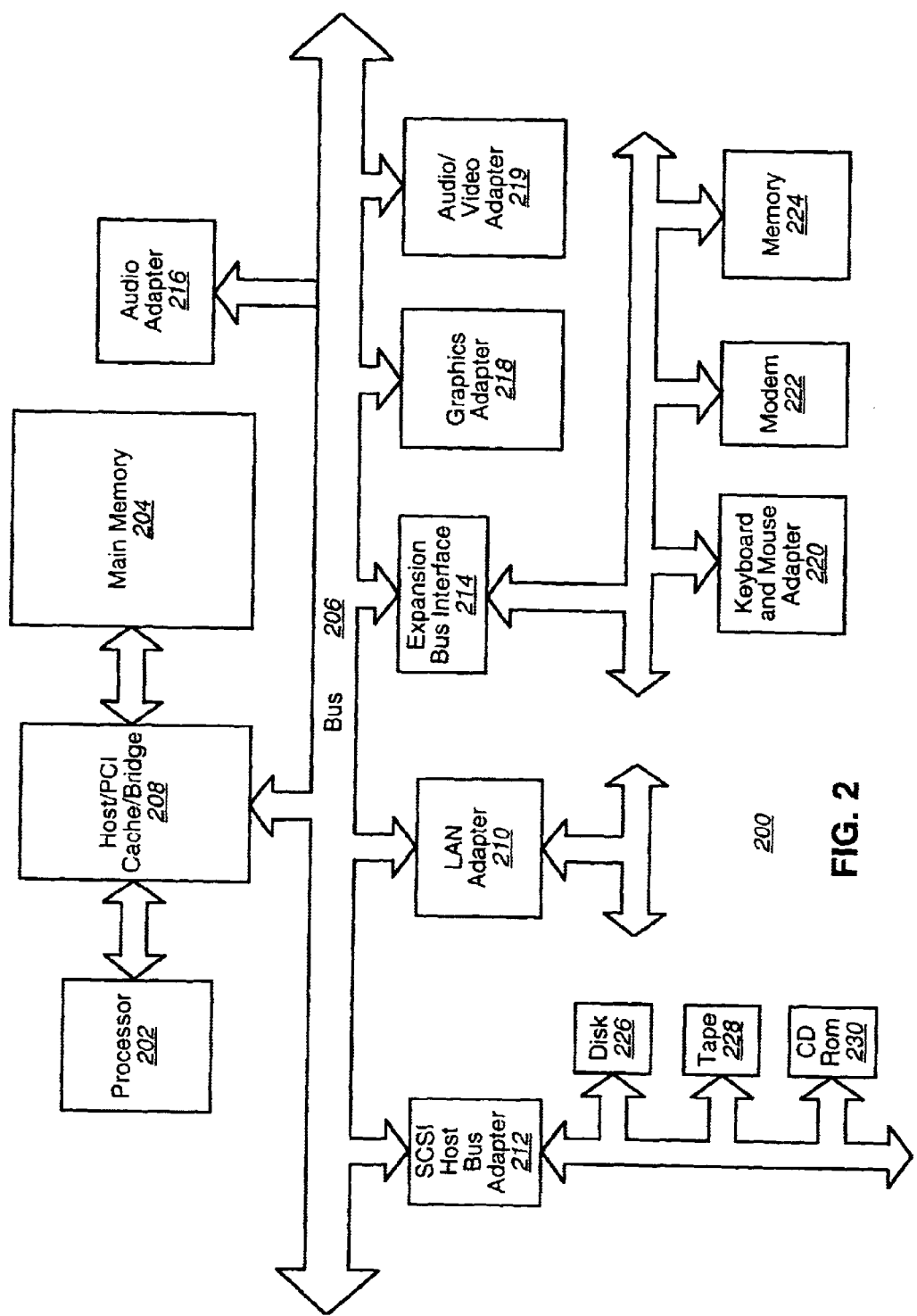
FIG. 2 is a block diagram of a data processing system in which the present invention may be implemented.

In FIG. 2, a block diagram of a data processing system 200 in which the present invention may be implemented is illustrated. In particular, data processing system 200 may be used to implement various server and client machines within communications test network 200. Data processing system 200 employs a peripheral component interconnect (PCI) local bus architecture. Although the depicted example employs a PCI bus, other bus architectures such as Micro Channel and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors. Those of ordinary skill in the art will appreciate that the hardware in FIG. 2 may vary. For example, other peripheral devices, such as optical disk drives and the like may be used in addition to or in place of the hardware depicted in FIG. 2. The depicted example is not meant to imply architectural limitations with respect to the present invention. Various operating systems may be used in data processing system 200. For example, Windows 95 or Windows NT, both available from Microsoft Corporation.

Figure 3:
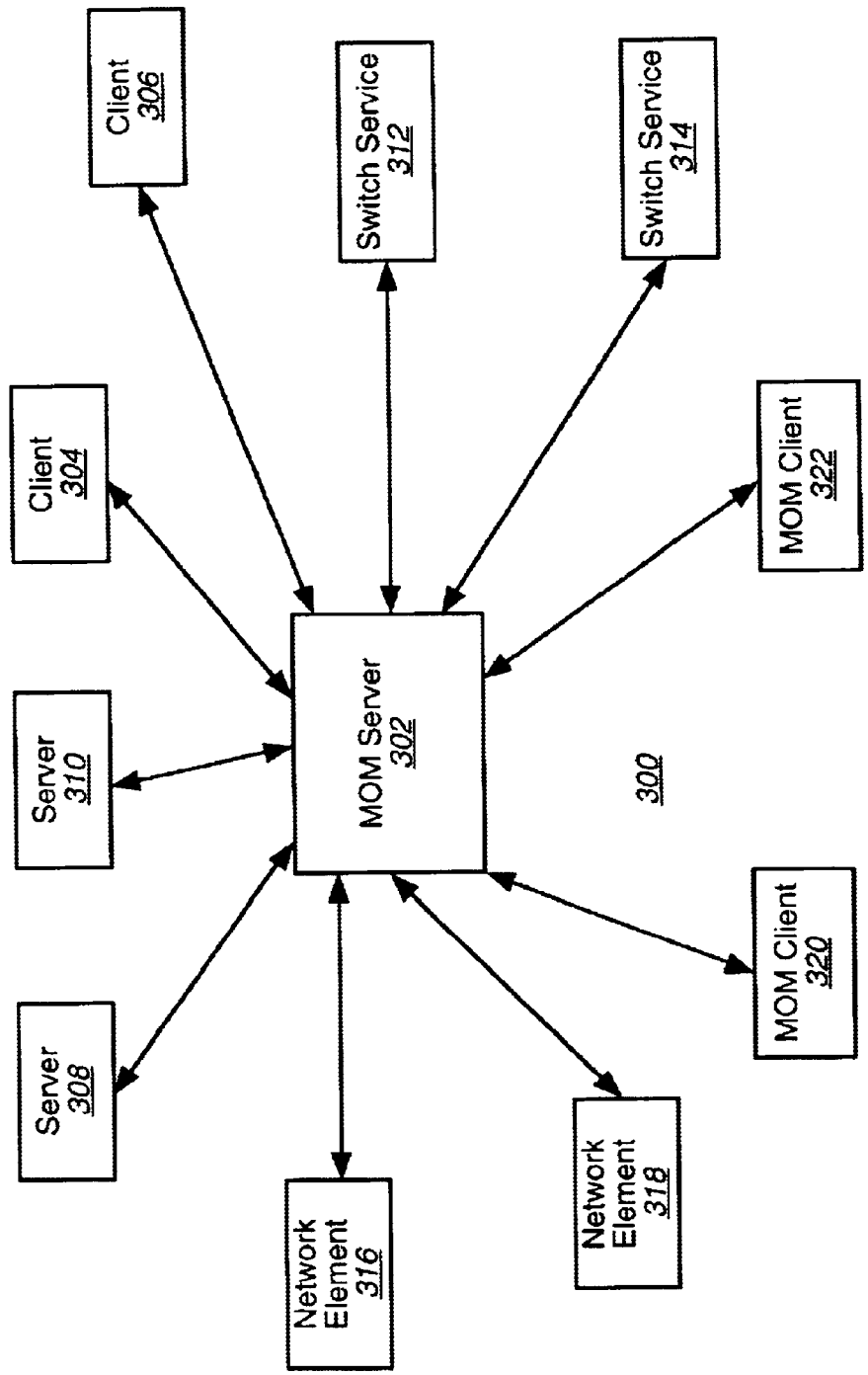
FIG. 3 is a diagram of logical communications topology in a communications test network in accordance with a preferred embodiment of the present invention.

Turning next to FIG. 3, a diagram of logical communications topology in a communications test network is illustrated in accordance with a preferred embodiment of the present invention. Topology 300 shows communications links between a monitor machine (MOM) server 302 and various objects in a communications test network. The objects in the depicted example in FIG. 3 include client 304, client 306, server 308, server 310, switch service 312, switch service 314, network element 316, network element 318, monitor machine client 320, and monitor machine client 322. Monitor machine server 302 uses these communications links to various objects within a communications test network to obtain information needed to monitor objects within the communications test network. For example, in the depicted example, information such as registry information found in Windows 95 operating systems are sent to monitor machine server 302 in FIG. 3 from various objects within the communications test network, such as between the monitor machine server and clients and servers. Status information for status variables are communicated between the monitor machine server and switches, network elements, and trunk resource descriptors (on switches). These status variables include information such as vital signs data, which is used to determine whether an object is functioning correctly. These variables may be altered through a monitor machine client as well as being viewed by a monitor machine client. A monitor machine client has some access to a monitor machine server including at least read-only access in the depicted example. Other types of access provided at a monitor machine client includes, for example, an ability to update some set of particular classes of objects, or an ability to update some specific machine, etc. In the depicted example, monitor machine clients retrieve object information from the monitor machine server upon initialization. The topology information is retrieved to create a display of the communications test network as in FIG. 4 below. This display is presented in the monitor machine client in a graphical user interface in which the user may interact with the display to view status information about various objects within the graphical user interface.

Figure 4:
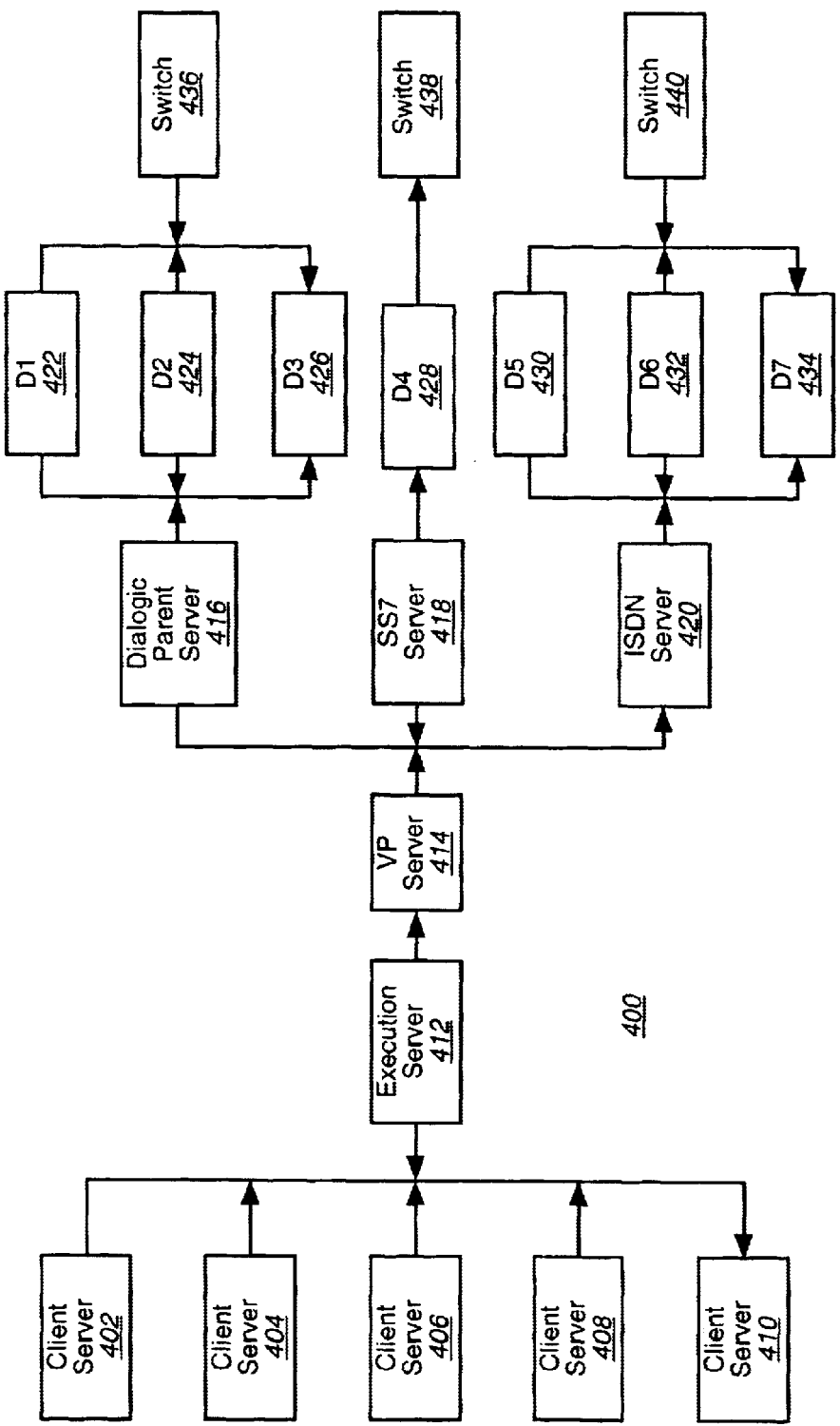
FIG. 4 is an illustration of a display of a communications test network in a monitor machine server client in accordance with a preferred embodiment of the present invention.

With reference now to FIG. 4, an illustration of a display of a communications test network in a monitor machine server client shown in accordance with a preferred embodiment of the present invention. Display 400 is an example of contents in a window of a monitor machine client. Objects are displayed as icons or as boxes in FIG. 4. Display 400 is a display of a network topology view of objects in the communications test network that are monitored by the monitor machine server. As can be seen, client servers 402–410 are connected to execution server 412 in display 400. Voice path (VP) server 414, dialogic server 416, SS7 server 418, and ISDN server 420 are custom servers in display 400. Also included in display 400 are trunks 422–434, which represent T1 lines in the depicted example. These trunks are connected to switches 436–440, which represent residential switches in this example. As can be seen, each object in FIG. 4 also is associated with an identifier in the form of a name. A user may select an object via a pointing device and view status variable details for the object based on the class of the object.

Figure 5A:
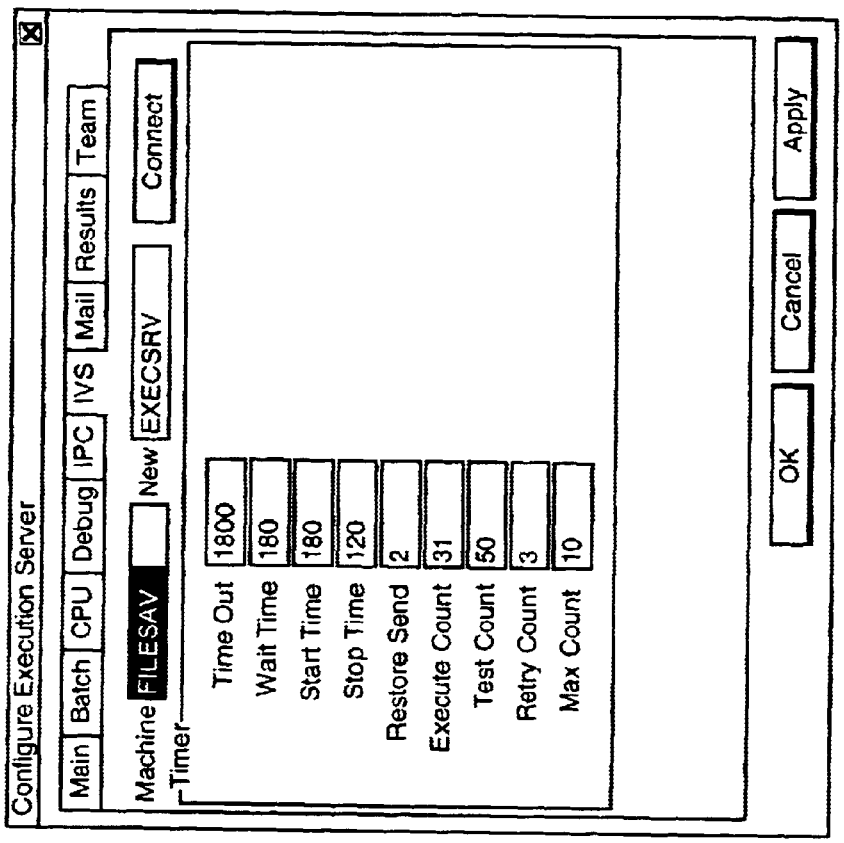
Figure 5B:
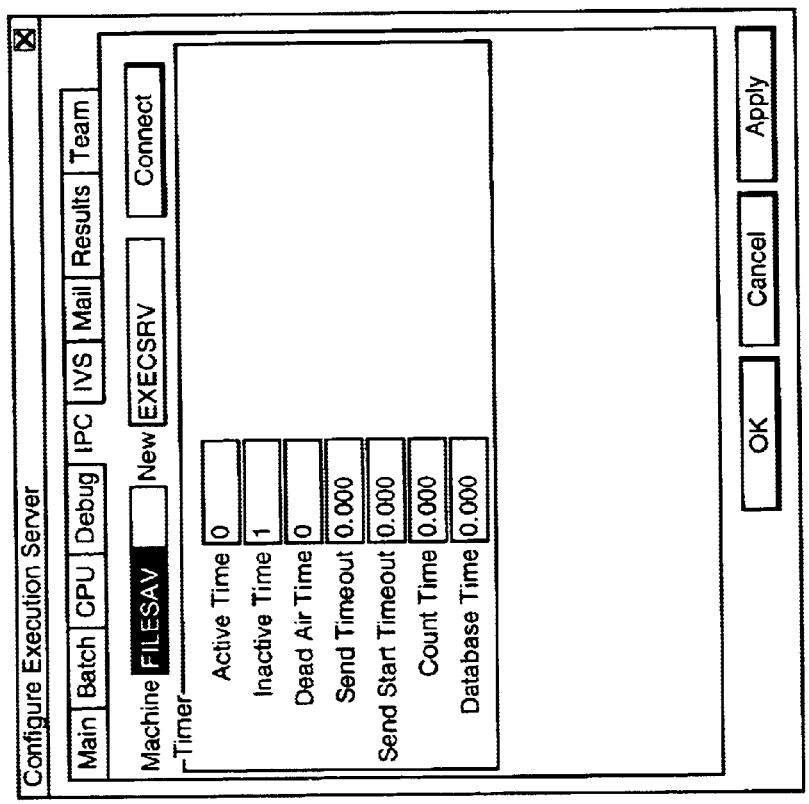
Figure 5C:
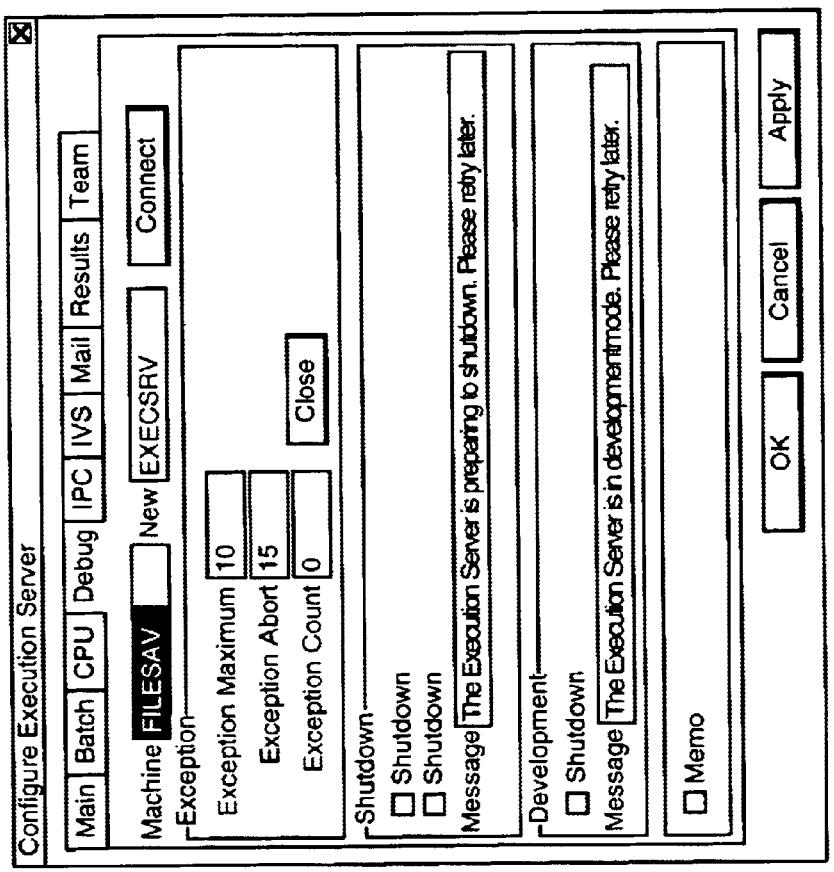
Figure 5D:
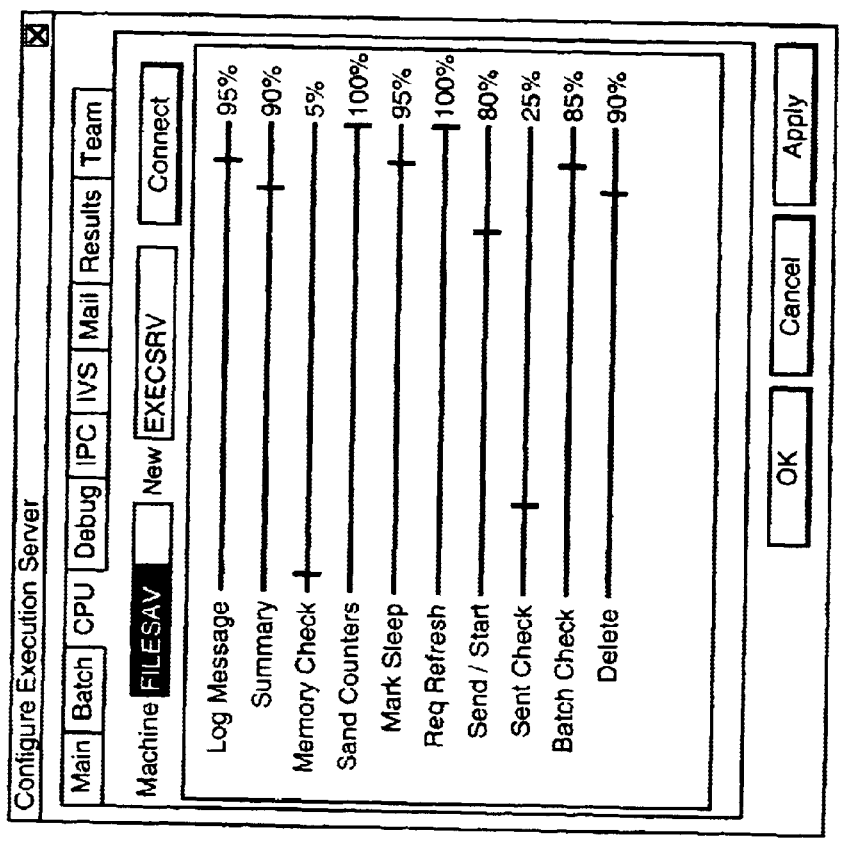
Figure 5E:
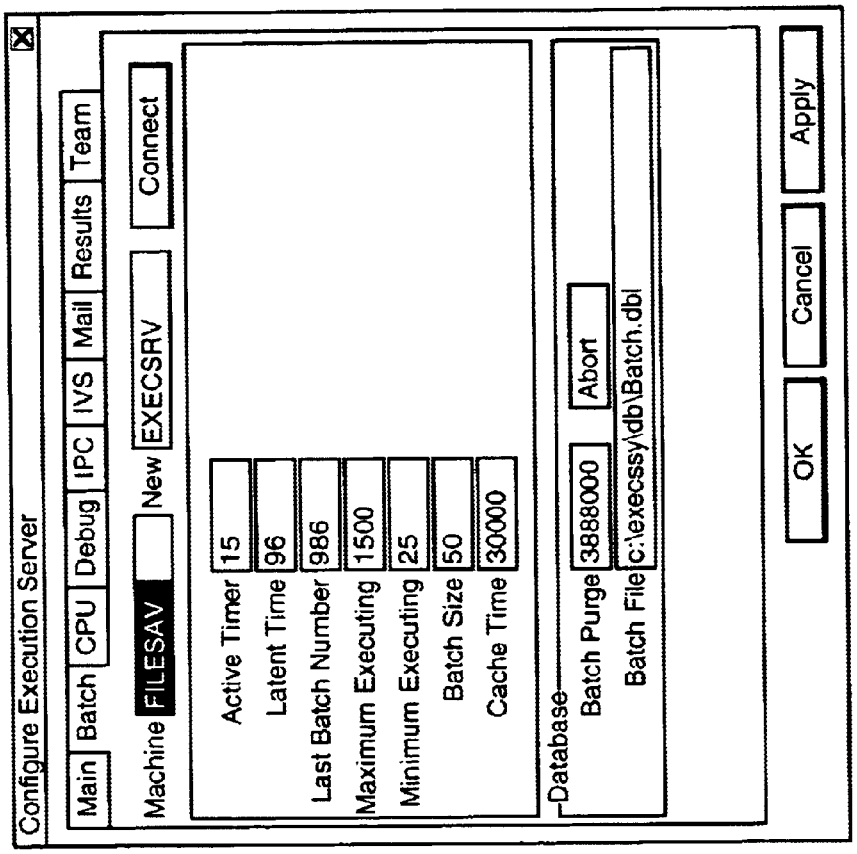
Figure 5F:
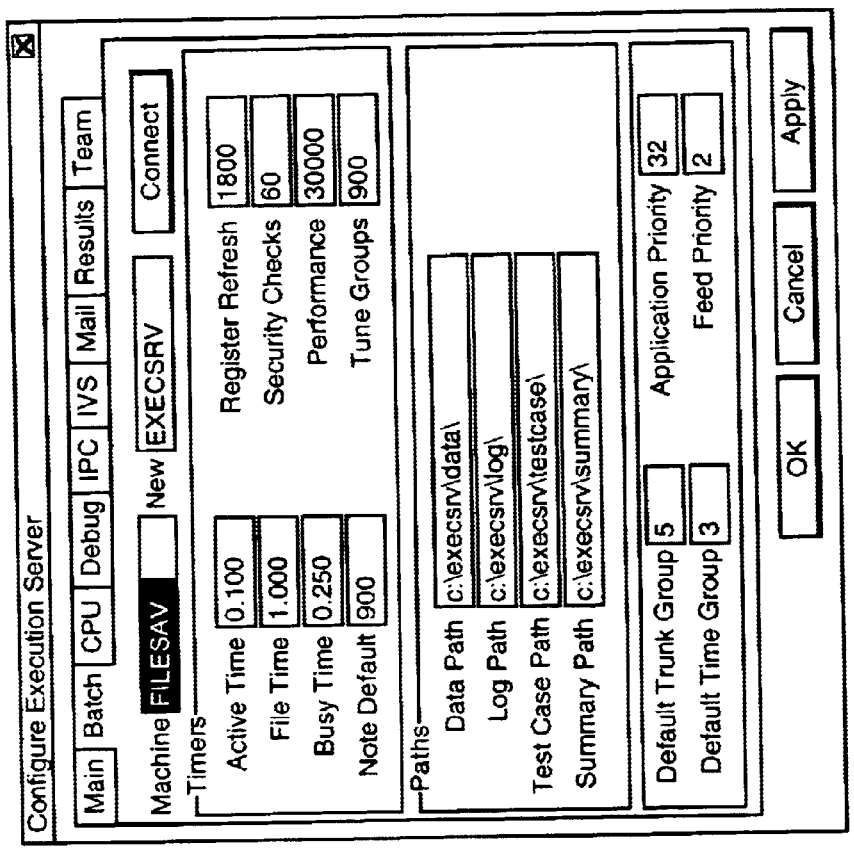

Turning next to FIGS. 5A–5G, diagrams of various information windows used in a monitor machine server client are illustrated in accordance with a preferred embodiment of the present invention. The status variables displayed in FIGS. 5A–5F are those for a server class object. Although the examples are that of an execution server, the same status variables are applicable to other server class objects. FIG. 5A shows Interactive Verification Server (IVS) status variables for the execution server, while FIG. 5B depicts interprocess communication (IPC) status variables for the execution server. FIG. 5C shows debug status variables for the execution server, FIG. 5D illustrates CPU status variables, FIG. 5E depicts batch status variables for the execution server, and FIG. 5F illustrates main status variables for the execution server. The status variables in FIGS. 5A–5F are shown for a particular example, and may vary depending on the implementation and object within the communications test network.

Turning next to FIG. 5G, a diagram of a monitor display 500 is depicted in accordance with a preferred embodiment of the present invention. Monitor display 500 includes a view channel section 502, which includes information such as the switch identification, span number, the number active channels (ACT), and a display of channels associated with a span. In addition, channels 510 is a graphical indication providing information on the activity of various channels. Server status section 512 provides information on the status of various servers within the network. Server status section 512 includes information identifying the service 514, the system 516, and whether the system is being monitored under monitor 518. The status of the server is found in status section 520 along with the number of restarts in section 522. A last start date is provided in section 524 of server status section 514. Execution counters section 528 provides information on various execution counters. The execution counters count the number of phone calls completed, such as, for example, the number of SS7 phone calls, the number of ISDN phone calls, the number of inbound phone calls, and the number of SS7 no voice calls. Top user section 530 identifies the top users of test equipment through out the lab. This information includes an identification of the user in section 532. Active user section 540 provides information on various users within the network. This section includes information identifying the user name 542, the facility 544, and the log in time 546.

Figure 6:
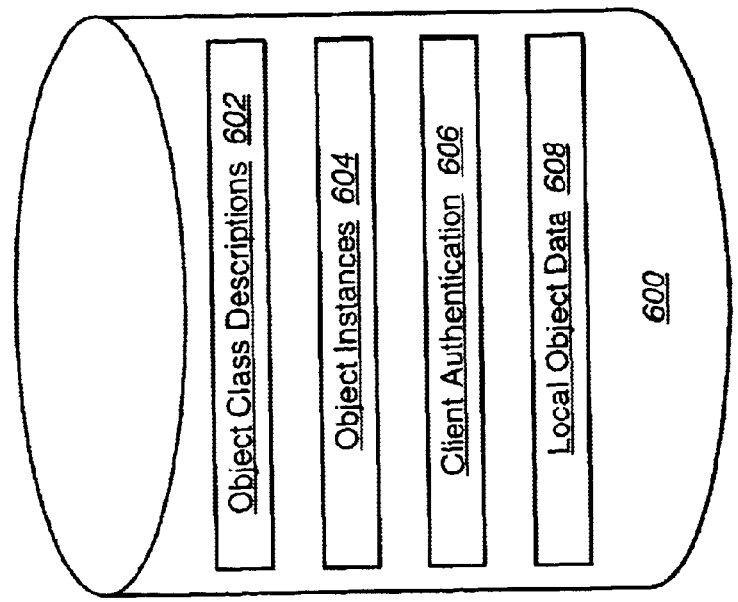
FIG. 6 is a diagram of data stored in a monitor machine server in accordance with a preferred embodiment of the present invention.

In FIG. 6, a diagram of data stored in a monitor machine server is depicted in accordance with a preferred embodiment of the present invention. Storage unit 600 contains a number of databases for a monitor machine server. Storage unit 600, in the depicted example, contains object class descriptions database 602, object instances database 604, client authentication database 606, and local object data database 608. Object class descriptions database 602 is employed to include data about each class of objects. In this example, object class descriptions database 602 will contain a description of how to display an object at a machine monitor client for objects of that class. In addition, object class descriptions database 602 will also include a list of status variables for each class of objects. Object instances database 604 is used to define a list of participating objects in the communications test network in which each object falls within a class in object class descriptions database 602. In the depicted example, each entry in object instances database 604 includes a name of an object, the class of the object, and the method of accessing status variables for the object.

Client authentication database 606 defines user identifiers and corresponding passwords for valid monitor machine clients along with a status indicator for whether the particular client is currently logged onto the monitor machine server. Also, information regarding the status level of access of the particular client is included in client authentication database 606. In the depicted example, each monitor machine client has at least read only access, and optionally, access for altering status variables of classes of objects or specific objects. Local object data database 608 is a database that is created and maintained after the machine monitor server has been started. This database contains values of status variables for all objects having entries within object instances database 604. This information is tracked at a system wide level.

Figure 7:
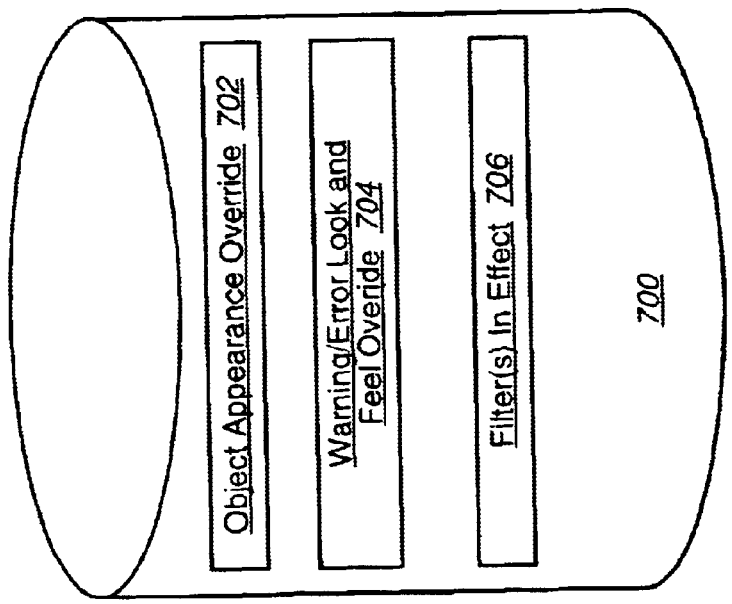
FIG. 7 is a diagram of data stored in a monitor machine client in accordance with a preferred embodiment of the present invention.

Next in FIG. 7, a diagram of data stored in a monitor machine client is depicted in accordance with a preferred embodiment of the present invention. The data is stored in storage device 700, which contains an object appearance override database 702, warning/error look and feel override database 704, and filter(s) in effect database 706. Data in object appearance override database 702 contains user customizations of how to display objects in the GUI display. This database also contains a list of class partitioned entries, each entry consisting of a status variable name, a minimum threshold value, and a display rule. For example, if the server object exceeds 75% CPU utilization, the corresponding object on MOM clients will appear red and flashing up until the user selects the object for the detailed window. Many different rules can be defined, such as, color, font, attribute (i.e. flashing, animation, or the like), without departing from the spirit and scope of the invention.

Data in warning/error look and feel override database 704 allows definition of how to display warning and/or error messages displayed to the GUI. Any rules defined in object appearance override database 702 that contain warning and/or message can be defined data within warning/error look and feel override database 704 to define the display of these messages. The definitions may include font, typeface, color and attribute of the messages. Warning/error look and feel override database 704 provides definitions of how to display warning and/or error messages displayed to the GUI. Any rules defined in object appearance overrides which include warning and error messages can be defined for font, typeface, color, and attribute of the messages. In other words, this database may be employed to tell the system not to process any network failure messages. Data in filter(s) in effect database 706 allows a user to filter only those objects of interest in the topology displayed to the graphical user interface. This database contains entries to find filters that are currently being used to filter objects for display within the graphical user interface. For example, filters can be defined for displaying only objects of particular class(es), objects of particular name wildcards, objects of particular status variable values or thresholds. The filters control how the screen is displayed based on user preferences in the depicted example.

Figure 8:
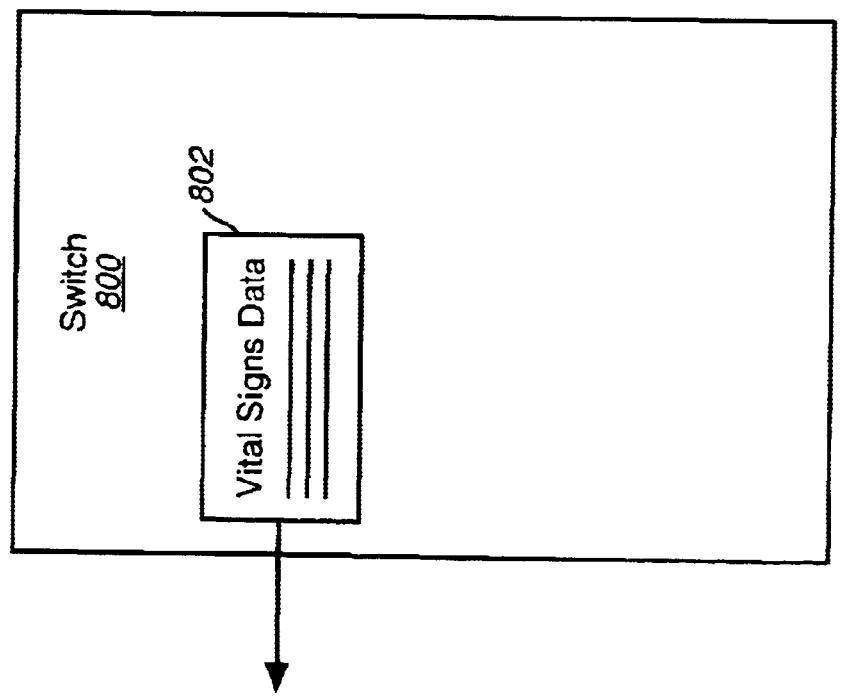
FIG. 8 is a diagram illustrating polling of an object for data in accordance with a preferred embodiment of the present invention.

With reference to FIG. 8, a diagram illustrating polling of an object for data is depicted in accordance with a preferred embodiment of the present invention. Switch 800 includes vital signs data 802, which is transmitted to a monitor machine server (not shown). The vital signs data 802 also is referred to as the status variables and is transmitted in response to the monitor machine server polling the switch for the status variables. Additionally, the monitor machine server may set status variables within switch 800. The polling of switch 800 may be applied to other objects, such as, for example, a network element. Additionally, objects may provide asynchronous event notifications. For example, if a T1 trunk loses synchronization, this type of event may be communicated to a monitor machine server without requiring polling from the monitor machine server. Whether polling is required or asynchronous event notifications occur depends on the class of the object. Depending on the object, status variables may be transmitted in response to polling and in response to selected events occurring within the object.

Figure 9:
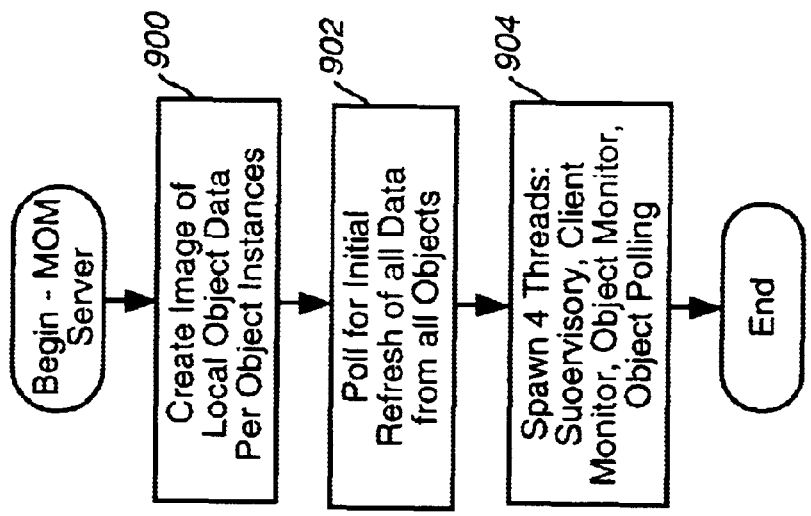
FIG. 9 is a flowchart of a process for use in a monitor machine server in accordance with a preferred embodiment of the present invention.

Turning now to FIG. 9, a flowchart of a process for use in a monitor machine server is illustrated in accordance with a preferred embodiment of the present invention. This process is employed to start the machine monitor server. The process begins by creating an image of the local object data based on the object instances present on the machine monitor server (step 900). This step starts the server and reads the data for the first time. Next, an initial refresh of all data from all objects within the communications test network is performed by polling the objects (step 902). In the depicted example, four threads are spawned (step 904). These threads include a supervisory thread, a client monitor thread, an object monitor thread, and an object poller thread. These threads are described in more detail below in FIGS. 10A–10D.

Figure 10A:
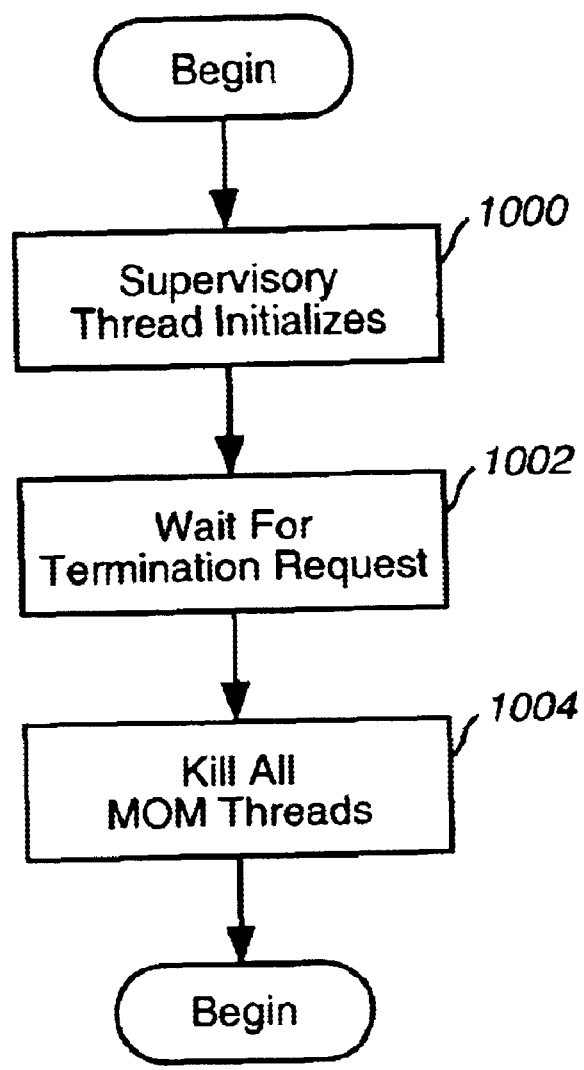
FIGS. 10A–10D are flowcharts of threads executing in a monitor machine server in accordance with a preferred embodiment of the present invention.

In FIGS. 10A–10D, flowcharts of threads executing in a monitor machine server are depicted in accordance with a preferred embodiment of the present invention. FIG. 10A is a flowchart of a process used in a supervisory thread in accordance with a preferred embodiment of the present invention. This process is used to terminate execution of other threads spawned in FIG. 9. The process begins with the supervisory thread initializing (step 1000). Thereafter, the thread waits for a termination request (step 1002). When a termination request occurs, the process kills or terminates all threads spawned for the monitoring processes (step 1004) with the process terminating thereafter.

Figure 10B:
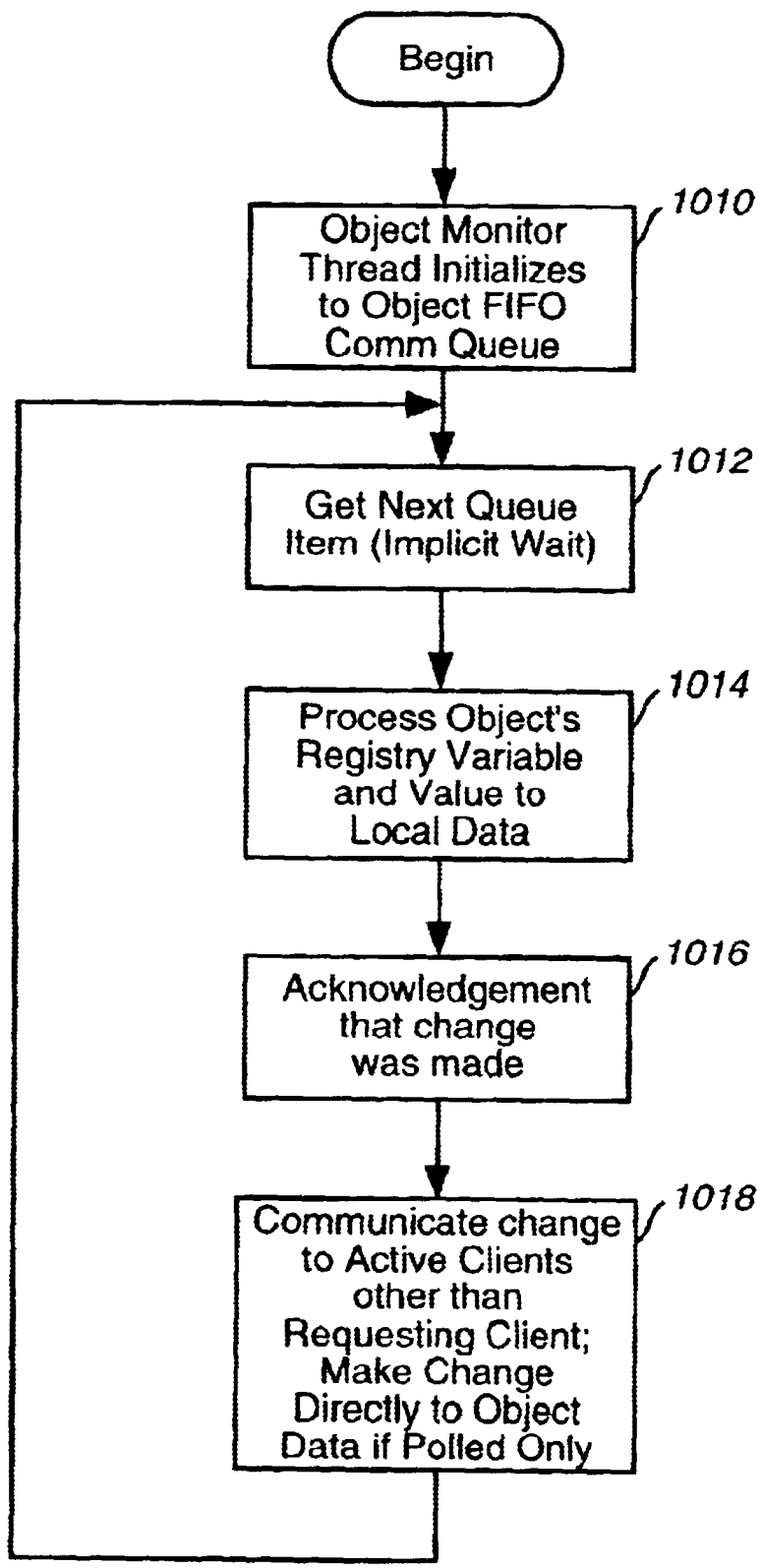

Next, FIG. 10B is a flowchart of a process used in an object monitor thread in accordance with a preferred embodiment of the present invention. The process begins by initializing the thread to process the object FIFO communications queue (step 1010). This queue contains registry variables and values for the variables from various objects within the communications test network. Thereafter, the process obtains the next queue item from FIFO communications queue (step 1012). The item in the queue is the next incoming message to be processed. This step includes an implicit way in which the process waits for an item to be present within the queue. Upon obtaining the next item, the object's registry variable and value are stored as local data in a local object database, such as local object database 608 in FIG. 6 (step 1014). Thereafter, an acknowledgement is sent back that the change to the local data was made (step 1016). The process then communicates the change to active monitor machine clients other than the client requesting the change. The change is then made directly to object data if polled only (step 1018) with the process then returning to step 1012.

Figure 10C:
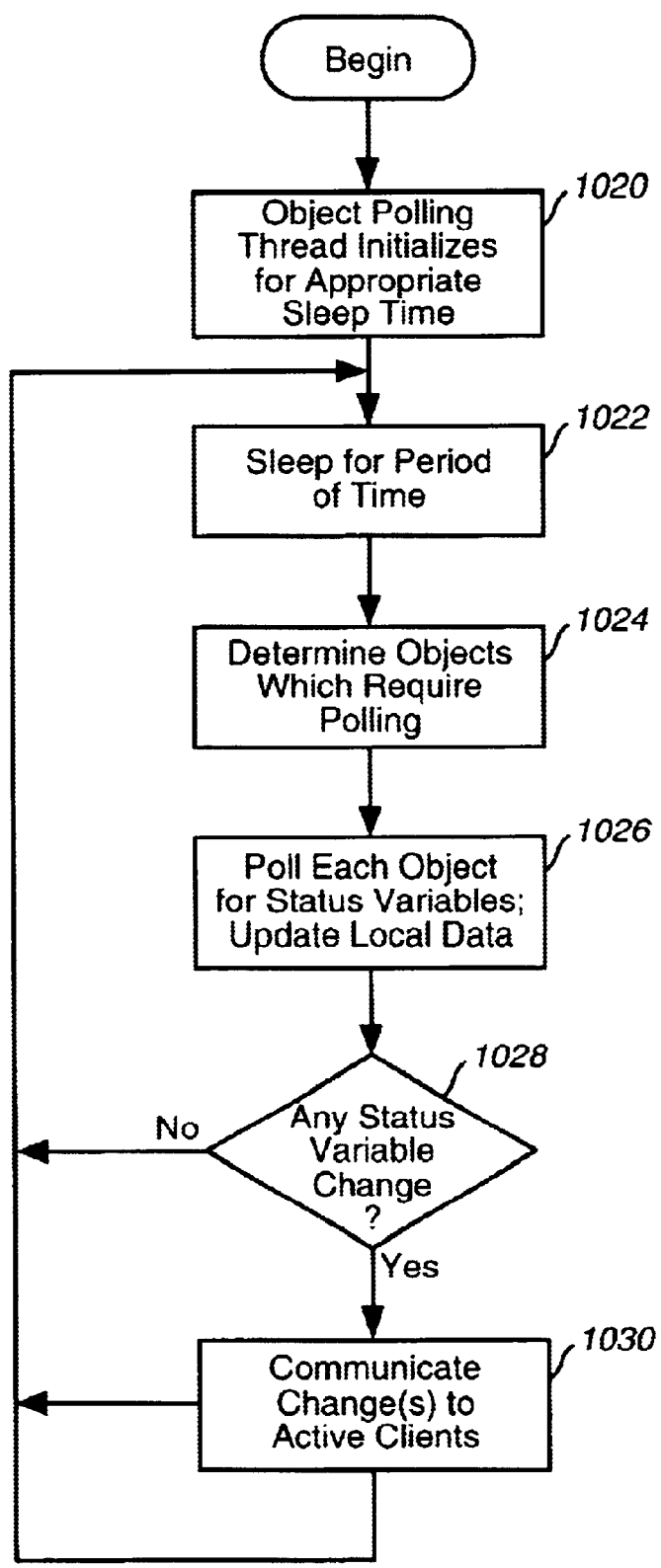

Turning next to FIG. 10C, a flowchart of process used in an object polling thread is depicted in accordance with a preferred embodiment of the present invention. The process begins with the thread initializing for an appropriate sleep time (step 1020). The process then sleeps for a selected period of time (step 1022). This period of time is used to provide a period of time between polling of an object within the communications test network. After the period of time has passed, a determination is made as to which objects within the communications test network require polling (step 1024). An object may be polled based on the expiration of a timer associated with the object. When the objects to be polled are identified, each identified object is polled for status variables, and local data is updated (step 1026). Thereafter, a determination is made as to whether any of the status variables have changed (step 1028). If a change in status variables is absent, the process returns to step 1022 to sleep for the selected period of time before polling of objects again occurs. If a change in status variables has occurred, the changes are communicated to active client monitor machines (step 1030) with the process then returning to step 1022 as described above.

Figure 10D:
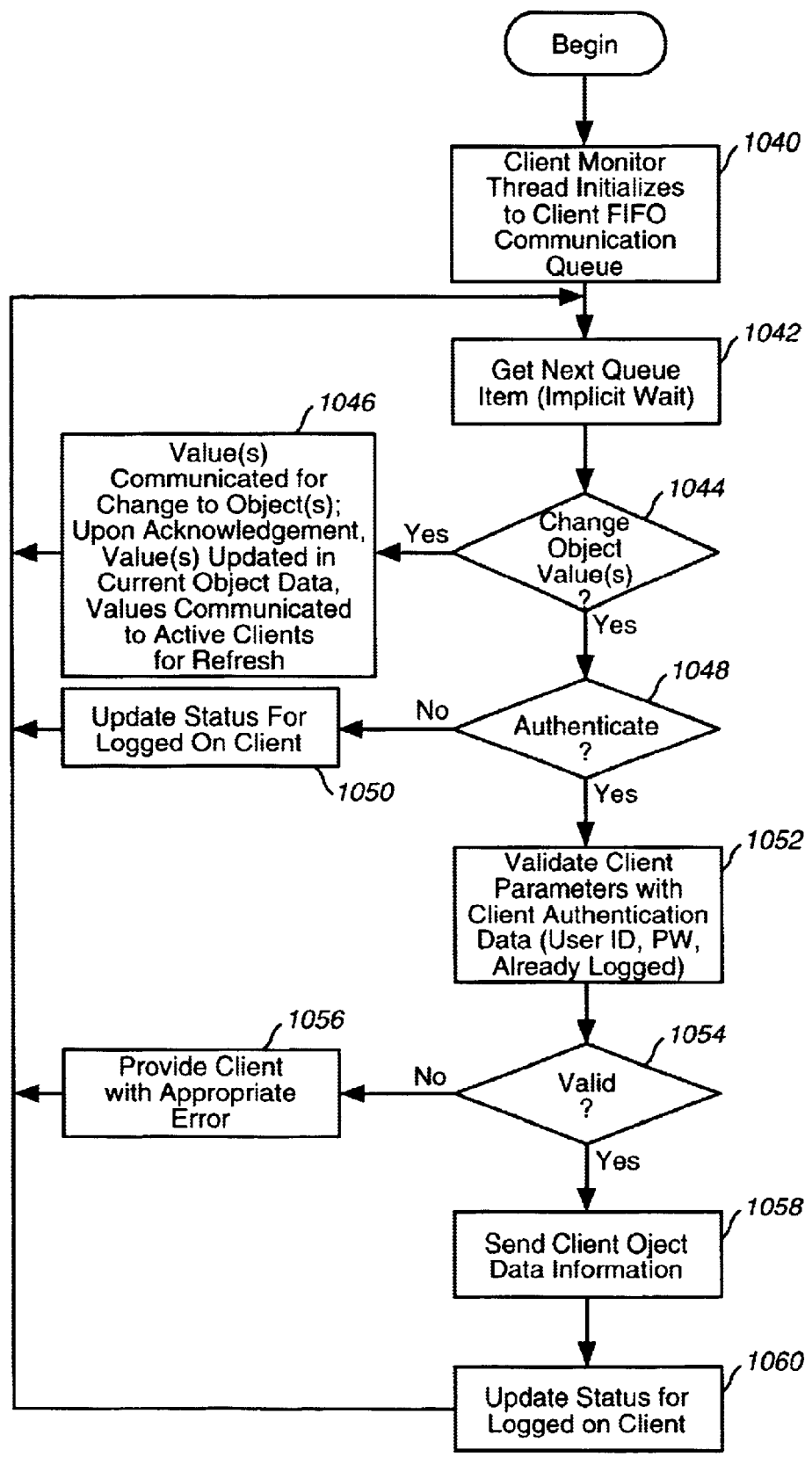

With reference now to FIG. 10D, a flowchart of a process used in client monitor thread is depicted in accordance with a preferred embodiment of the present invention. The process begins by initializing the client monitor thread to process items in the client FIFO communications queue (step 1040). Next, the next queue item is obtained from the client FIFO communications queue (step 1042). An implicit wait occurs in step 1042 for an item to be present within the queue. Upon obtaining an item from the queue, a determination is made as to whether values of status variables for the object have changed (step 1044). If one or more values for an object has changed, these changed values are communicated to the object for change upon acknowledgement by the object that the change was made, the value or values are updated in the current object data and the values are communicated to active monitor machine clients for refreshing displays within these data processing systems (step 1046). Thereafter, the process returns to step 1042. If values of status variables for the object have not changed, a determination is made as to whether to authenticate monitor machine clients (step 1048). If monitor machine clients are not to be authenticated, the status for monitor machine clients logged onto the monitor machine server is updated (step 1050) with the process then returning to step 1042. Otherwise, the monitor machine client is validated (step 1052). The validation includes validating monitor machine client parameters with monitor machine client authentication data. This data, in the depicted example, includes user ID and a password. The data also may include a determination as to whether the monitor machine client is already logged on to the monitor machine server. Thereafter, a determination is made as to whether the data used to authenticate the monitor machine client is valid (step 1054). If the data is not valid, appropriate error messages are provided to the monitor machine client (step 1056) with the process then returning to step 1042. Otherwise, data for objects within the communications test network are sent to the monitor machine client (step 1058). Thereafter, the status for the monitor machine client logged on to the monitor machine server is updated (step 1060). During updating in step 1060, system statistics are sent to the client for display.

Figure 11:
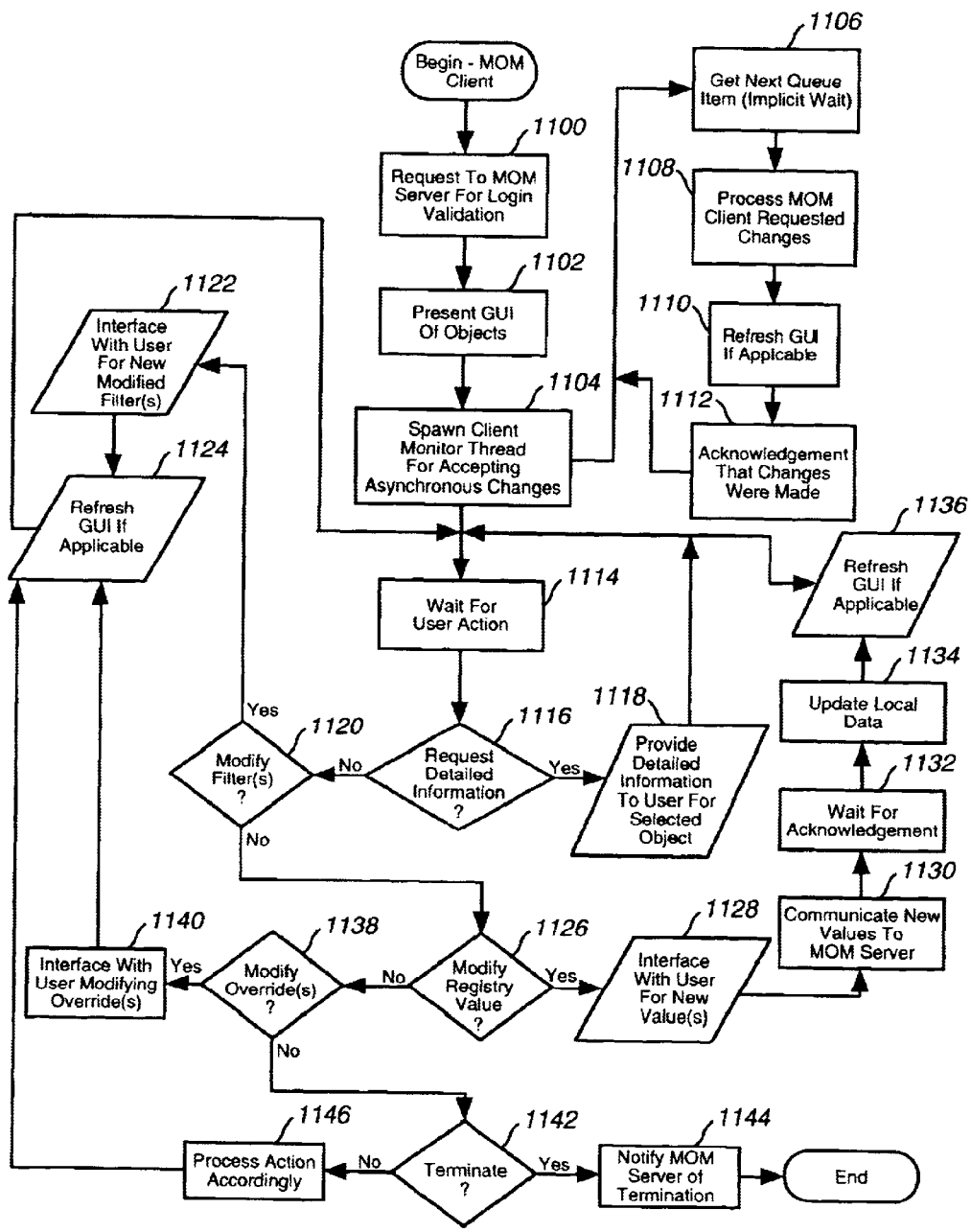
FIG. 11 is a flowchart of a process used in a monitor machine client in accordance with a preferred embodiment of the present invention.

Referring next to FIG. 11, a flowchart of a process used in a monitor machine client is show in accordance with a preferred embodiment of the present invention. This flowchart illustrates the steps used when starting a monitor machine client. The process begins by sending a request to the monitor machine server for login validation (step 1100). After validation, a graphical user interface containing a display of objects within the communications test network is displayed within the monitor machine client (step 1102). In the depicted example, this display avoids the use of scroll bars within the graphical user interface, if possible. This display includes any filters and overrides selected by the user for displaying information. Next, a client monitor thread is spawned for accepting asynchronous changes received from various servers (step 1104). From step 1104, the process splits into two paths that execute at the same time. In one path, the process obtains the next queue item (step 1106). This step includes an implicit way for an item to appear on the queue. Upon obtaining an item from the queue, monitor machine client requested changes are processed (step 1108). Thereafter, the graphical user interface is updated if changes are needed (step 1110). Acknowledgement is made of the changes (step 1112) with the process then returning to step 1106.

In the second path, the process waits for user action (step 1114). In waiting for user action, the process waits for the user to provide input via the graphical user interface. The user input may include, for example, selection of an object for display of detailed information. Upon detecting user action, a determination is made as to whether detailed information has been requested (step 1116). If detailed information has been requested, the process then provides information to the user by displaying this information within the graphical user interface (step 1118). Thereafter, the process returns to step 1114 to wait for user action.

With reference again to step 1116, if detailed information has not been requested by the user action, a determination is made as to whether the user action indicates that one or more filters should be modified (step 1120). If one or more filters are to be modified, the process then interfaces with the user to create new filters or modify existing filters (step 1122). In interfacing with the user, the process allows the user to select new filters or modify existing filters used in filtering information that is to be displayed to the user on the graphical user interface. Thereafter, the process refreshes the graphical user interface, if applicable (step 1124) with the process returning to step 1114.

With reference again to step 1120, if the user action does not indicate that one or more monitors should be filtered, a determination is made as to whether the user action indicates that one or more registry values should be modified (step 1126). If one or more registry values are to be modified, the process interface with the user for these new values (step 1128). For example, when interfacing with the user, the process will provide the user with various windows to enter changes to registry values. These windows may be similar to those displayed status variables in FIGS. 5A–5F. Thereafter, the new values entered by the user are communicated to the monitor machine server (step 1130). The process then waits for an acknowledgment from the monitor machine server (step 1132). Upon receiving an acknowledgement, the local data is updated (step 1134). The local data updated in step 1134 involves data that describes filters, such as, for example, a filter display used to display performance information. Thereafter, the graphical user interface is updated if applicable (step 1136) with the process then returning to step 1114.

With reference again to step 1126, if the user action does not indicate that one or more registry values is to be modified, a determination is made as to whether the user action indicates whether one or more overrides should be modified (step 1138). If one or more user overrides are to be modified, the process interfaces with the user to modify these overrides (step 1140). In this step, the process receives user input in modifying one or more overrides. This input may be made through various windows displayed to the user within the graphical user interface. Thereafter, the process proceeds to step 1124 to refresh the graphical user interface as previously described.

With reference again to step 1138, if the user action does not indicate that one or more overrides are to be modified, the process then determines whether the user action indicates that the session with the monitor machine server initiated by the logon should be terminated (step 1142). If the session is to be terminated, the monitor machine server is notified of the termination (step 1144) with the process then terminating. Otherwise, the user action is processed accordingly (step 1146) with the process then returning to step 1124 as described above. Step 1146 provides for other user actions, such as those initiated to resize the display of objects to the user or to change other parameters used to display objects within the graphical user interface.

Figure 12:
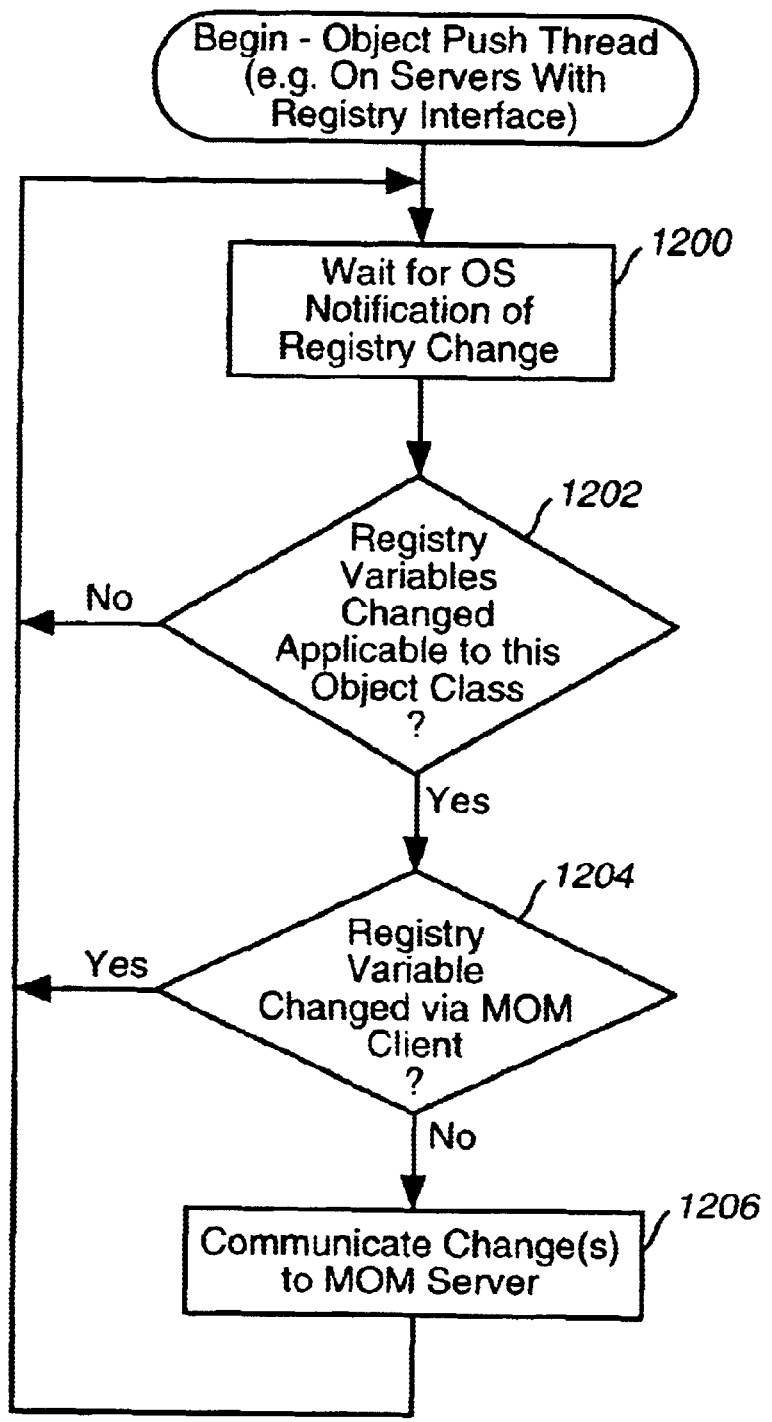
FIG. 12 is a flowchart of an object push thread process implemented in a server to provide data to a monitor machine server in accordance with a preferred embodiment of the present invention.

Turning now to FIG. 12, a flowchart of an object push thread process implemented in a server to provide data to a monitor machine server is illustrated in accordance with a preferred embodiment of the present invention. The processes in this flowchart are implemented in servers, such as, for example, servers running an operating system with a registry interface (i.e., Windows 95 or Windows NT). The processes begin by waiting for the operating system to make a notification that the registry has changed (step 1200). Thereafter, a determination is made as to whether the changed registry variables are applicable to the object class in which the server is located (step 1202). If the changes are not applicable to object class, the process returns to step 1200. Otherwise, a determination is made as to whether the registry variables have been changed via the monitor machine client (step 1204). If the registry variables have changed via the monitor machine client, the process returns to step 1200. Otherwise, the changes are communicated to the monitor machine server (step 1206) with the process then returning to step 1200.

Figure 13:
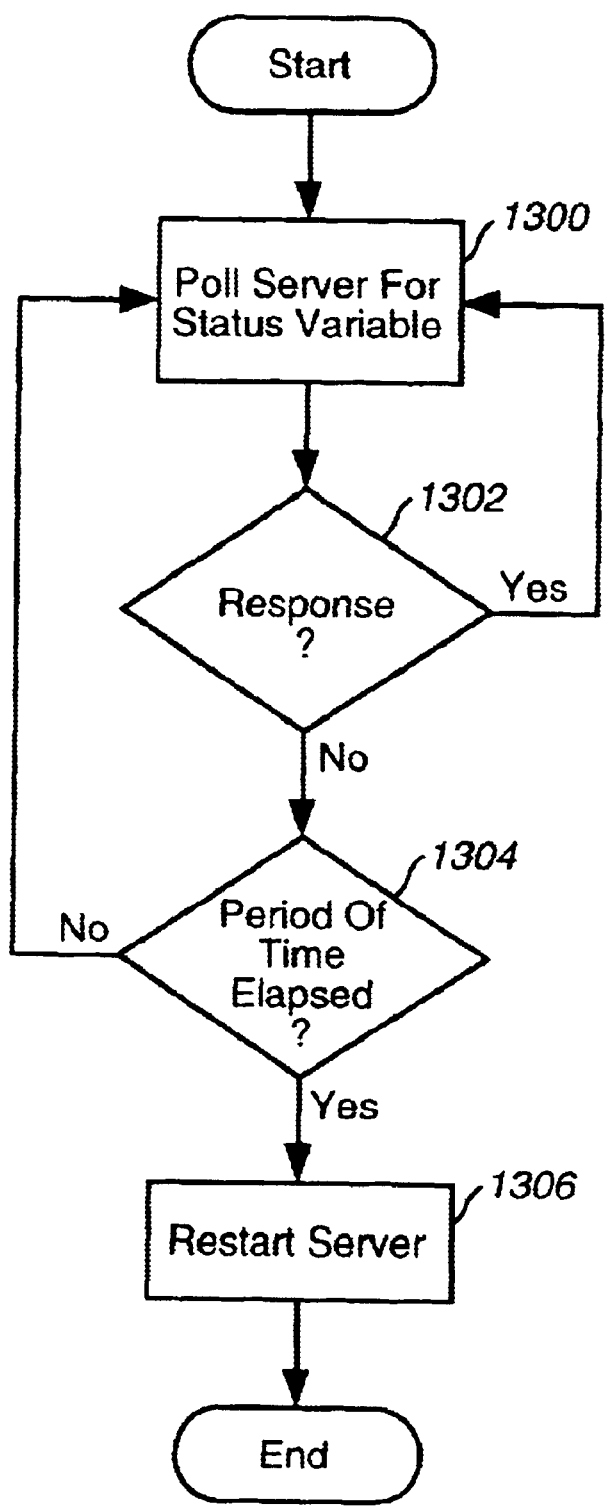
FIG. 13 is a flowchart of a process for monitoring server activity in accordance with a preferred embodiment of the present invention.

Turning now to FIG. 13, a flowchart of process for monitoring server activity is depicted in accordance with a preferred embodiment of the present invention. The process begins by polling a server for status variables (step 1300). A determination is made as to whether a response is returned from the server (step 1302). If a response is returned from the server, the process returns to step 1300. Otherwise, a determination is made as to whether a selected period of time has elapsed (step 1304). The period of time is selected as a period of time after which the server can be assumed to be not performing correctly. If the selected period of time has not elapsed the process returns to step 1300. Otherwise, the process initiates steps needed to restart the server (step 1306). These steps may include, for example, commands sent to the server to "reboot" the server or an error message sent to a user or technician that the server is not operating correctly, such that corrective action may be taken.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application and to enable others of ordinary skill in the art to understand the invention for various embodiments with various modifications as are suited to the particular use contemplated. While the invention has been particularly shown and described with reference to a preferred embodiment, it will be understood by those skilled in the art that various changes in form and detail may be made therein without departing from the spirit and scope of the invention.

What is claimed is:

1. A communications system comprising:
a server connected to a network in communication with a plurality of elements and includes a monitoring means configured to obtain status information from the plurality of elements; and
a client configured to display the status information on a graphical user interface,
wherein the server includes means for receiving status information from an object push thread process running on one of the plurality of elements, the one element having an operating system with a registry interface, the monitoring means utilizing a process running on the one element also having an operating system with a registry interface, that waits for said operating system to make a notification that a registry has changed and determines whether a changed registry variable is applicable to an object class in which the one element is located, whereby all changed registry variables not changed by the client are communicated to the server.

2. The communications system of claim 1, wherein the plurality of elements includes a switch.

3. The communications system of claim 1, wherein the plurality of elements includes a trunk.

4. The communications system of claim 1, wherein the plurality of elements includes a network element.

5. The communications system of claim 1, wherein the plurality of elements include status variables.

6. The communications system of claim 1, wherein the plurality of elements includes a number of servers and further comprising:
polling means for polling the number of servers for a response;
detection means for detecting an absence of a response from a server within the number of servers after a selected period of time; and restart means for restarting the server in response to the absence of a response after a selected period of time.

7. The communications system of claim 1, wherein the client comprises:
first presentation means for displaying an icon on the graphical user interface for each of the plurality of elements;
second presentation means for displaying status information for an element associated with the selected icon; and
third presentation means for displaying the changed registry variable for said one element upon selection of an icon associated with said one element when said server receives said registry status information.

8. The communications system of claim 7, wherein the client further includes:
filter means for filtering the status information displayed by the second presentation means.

9. The communications system of claim 1, wherein the server includes an authentication database used to set a level of access allowed to the client.

10. The communications system of claim 1, wherein each of the plurality of elements includes status variables.

11. The communications system of claim 10, wherein the server includes a database storing the status variables and a plurality of entries, each entry including an object, a class, and a method for accessing the status variables associated with the object.

12. The communications system of claim 11, wherein the plurality of elements form a class and each of the plurality of elements is an object within the class.

13. A method for monitoring a communications test network having a plurality of elements, the method comprising:
obtaining status information from one of the plurality of elements during execution of tests, wherein the one element has an operating system with a registry interface and is configured to run an object push thread that determines whether a registry variable that has changed is applicable to an object class associated with the one element, the status information including the changed registry variable;
wherein the object push thread process comprises,
waiting for the operating system to make a notification that a registry has changed,
determining whether changed registry variables are applicable to the object class in which the one element is located, returning to the waiting step if the changed registry variables are not applicable to the object class in which the one element is located, returning to the waiting step if said changed registry variables have been changed via a client, receiving the changed registry variables when the changed registry variables are applicable to the object class in which the one element is located and the changed registry variables have not been changed via the client, and repeating the object push thread by returning to the waiting step; and displaying the status information on a graphical user interface.

14. The method of claim 13 wherein the graphical user interface is located on a server.

15. The method of claim 13, wherein the graphical user interface is located on the client.

16. The method of claim 13, wherein the plurality of elements includes a server element, and the method further comprises:

restarting the server element in response to an absence of the status information being returned by the server element.

17. The method of claim 16, wherein the restarting step is performed after a period of time has elapsed.

18. The method of claim 13, wherein an object is displayed for each of the plurality of elements within the communications test network.

19. The method of claim 13, wherein the step of displaying status information comprises:

displaying a plurality of objects within a graphical user interface, wherein the plurality of objects represent the plurality of elements; detecting selection of an object within the plurality of objects, wherein the object is a selected object; and displaying status information for the selected object on the graphical user interface.

20. The method of claim 13, wherein the plurality of elements are within a class including a server class.

21. A computer program product used in a computer for monitoring a communications test network having a plurality of elements, the computer program product comprising:

first instructions for obtaining status information from the plurality of elements, during execution of tests, including at least one server element having an operating system with a registry interface and is configured to run an object push thread that determines whether a registry variable that has changed is applicable to an object class associated with the one server element, the status information including the changed registry variable, wherein the object push thread process comprises, waiting for the operating system to make a notification that a registry has changed, determining whether changed registry variables are applicable to the object class in which the one element is located, returning to the waiting step if the changed registry variables are not applicable to the object class in which the one element is located, returning to the waiting step if said changed registry variables have been changed via a client, receiving the changed registry variables when the changed registry variables are applicable to the object class in which the one element is located and the changed registry variables have not been changed via the client, and repeating the object push thread by returning to the waiting step;

second instructions displaying the status information on a graphical user interface;

third instructions for restarting the server element in response to an absence of status information being returned by the server element;

fourth instructions for obtaining, during execution of tests, status information from the plurality of elements; and fifth instructions for reporting the status information.

22. A communications system comprising:

a server connected to a network in communication with a plurality of elements and configured to obtain status information from the plurality of elements; and a client configured to retrieve status information from the server and to display the retrieved status information on a graphical user interface, wherein one of the plurality of elements has an operating system with a registry interface and running an object push thread process for reporting status information to the server, the plurality of elements including one server element, and wherein the server polls the server element for a response, monitors for an absence of a response from the server element after a selected period of time, and restarts the server element in response to the absence of a response after the selected period of time, wherein the server element also includes status variables, the server retrieving the status variables from the server element to obtain the status information, the one element utilizes the operating system to make a notification that a registry has changed and determines whether a changed registry variable is applicable to an object class in which the one element is located, whereby all changed registry variables not changed by the client are communicated to the server.

23. The communications system of claim 22, wherein the client displays the status information by displaying an icon on the graphical user interface for each of the plurality of elements, detecting a selection of an icon, wherein the icon is a selected icon, and displaying status information for an element associated with the selected icon.

24. The communications system of claim 22, wherein the plurality of elements includes a switch.

25. The communications system of claim 22, wherein the plurality of elements includes a trunk.

26. The communications system of claim 22, wherein the plurality of elements includes a network element.

27. The communications system of claim 22, wherein the server includes an authentication database used to set a level of access allowed to the client.

28. A communications system comprising:

a server including monitoring means for obtaining status information from a plurality of elements and means for receiving status information from an object push thread process running on one of the plurality of elements, the one element having an operating system with a registry interface; and a client including communications means for retrieving status information from the server and display means for displaying status information on a graphical user interface, wherein the object push thread process comprises,
  performing a waiting step for the operating system to make a notification that a registry has changed,
  determining whether changed registry variables are applicable to the object class in which the one element is located,
  returning to the waiting step if the changed registry variables are not applicable to the object class in which the one element is located,
  returning to the waiting step if said changed registry variables have been changed via the client,
  communicating the changed registry variables to the server when the changed registry variables are applicable to the object class in which the one element is located and the changed registry variables have not been changed via the client, and
  repeating the object push thread by returning to the waiting step.

* * * * *